(12) United States Patent
Ueno

(10) Patent No.: US 11,505,264 B2
(45) Date of Patent: Nov. 22, 2022

(54) INFORMATION ACQUISITION APPARATUS FOR CRAWLER

(71) Applicant: SUMITOMO RUBBER INDUSTRIES, LTD., Kobe (JP)

(72) Inventor: Yoshio Ueno, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 0 days.

(21) Appl. No.: 17/375,335

(22) Filed: Jul. 14, 2021

(65) Prior Publication Data
US 2022/0135154 A1 May 5, 2022

(30) Foreign Application Priority Data
Nov. 2, 2020 (JP) .............. JP2020-183547

(51) Int. Cl.
B62D 55/12 (2006.01)
G01N 29/44 (2006.01)
B60Q 9/00 (2006.01)
(52) U.S. Cl.
CPC ............. *B62D 55/12* (2013.01); *B60Q 9/00* (2013.01); *G01N 29/44* (2013.01)
(58) Field of Classification Search
CPC ........... B62D 55/12; B60Q 9/00; G01N 29/44
See application file for complete search history.

(56) References Cited

FOREIGN PATENT DOCUMENTS

| EP | 0504578 A1 | * | 9/1992 |
| JP | 10-119845 A |   | 5/1998 |
| JP | 2004314822 A | * | 11/2004 |

OTHER PUBLICATIONS

English machine translation of Depfenhart (EP 0504578 A1) (Year: 1992).*
English machine translation of Hirota (JP 2004-314822 A) (Year: 2004).*

* cited by examiner

Primary Examiner — Roy Y Yi
Assistant Examiner — Geoffrey T Evans
(74) Attorney, Agent, or Firm — Birch, Stewart, Kolasch & Birch, LLP

(57) ABSTRACT

An information acquisition apparatus for acquiring information relating to a crawler configured to be wound around a rotationally driven sprocket connected to a rotation axle provided in a vehicle, the crawler having a meshing part configured to mesh with a tooth or a tooth base of the sprocket and being circulatorily driven in conjunction with rotation of the sprocket is provided. The information acquisition apparatus includes a memory and a processor. The memory stores, as initial information, the number of meshing parts of the crawler and information specifying the meshing part that is at a predetermined position, prior to the vehicle traveling. The processor acquires rotation information of the sprocket. The processor, while the vehicle is traveling, information specifying the meshing part that is at the predetermined position, based on the initial information and the rotation information.

18 Claims, 10 Drawing Sheets

2

INFORMATION ACQUISITION APPARATUS FOR CRAWLER

CROSS REFERENCE TO RELATED APPLICATIONS

This application claims priority to Japanese Patent Application No. 2020-183547 filed on Nov. 2, 2020, the entire contents of which are incorporated herein by reference.

FIELD OF INVENTION

The present invention relates to an information acquisition apparatus, system and program for acquiring information relating to a crawler.

BACKGROUND

Tracked vehicles (crawler vehicles) to which continuous tracks are mounted are known as vehicles that are used in environments that cannot be appropriately traveled with tires, such as rough terrain, deserts and snow. Continuous tracks are also referred to as crawlers, crawler belts, endless belts, track belts, caterpillars (registered trademark) and the like, but will be collectively referred to as "crawlers" below. If a crawler is cut or a component such as a metal core included in the crawler drops out, the vehicle can no longer travel. Crawlers are also usually used in places with poor footing, and it is extremely troublesome if a crawler suddenly fails. That is, the task of replacing a crawler can require a lot of work, and can also require heavy equipment such as a crane. Failure of a crawler also results in a long downtime.

JP H10-119845A discloses a tracked vehicle provided with a system that is able to record and read out data such as the travel distance, travel direction and travel speed of a crawler in order to manage the quality of the crawler such as the degree of fatigue. This tracked vehicle includes a crawler in which a transponder that transmits predetermined information as a response signal to an external interrogation signal is embedded in a predetermined position and a transponder identification system.

However, crawlers applicable to the tracked vehicle disclosed in JP H10-119845A are limited to crawlers that have a transponder communicable with a transponder identification system installed on the vehicle side embedded therein. In other words, the abovementioned system may not function even if the correct sized crawler is mounted, and the degree of freedom for selecting crawlers is greatly restricted.

SUMMARY OF THE INVENTION

An object of the present invention is to provide an information acquisition apparatus, system and program capable of acquiring information relating to a crawler, regardless of whether the crawler is communicable with a system installed in a vehicle.

An information acquisition apparatus according to a first aspect is an information acquisition apparatus for acquiring information relating to a crawler configured to be wound around a rotationally driven sprocket connected to a rotation axle provided in a vehicle, the crawler having a meshing part configured to mesh with a tooth or a tooth base of the sprocket and being circulatorily driven in conjunction with rotation of the sprocket, the information acquisition apparatus including a storage unit, a rotation information acquisition unit and a derivation unit. The storage unit is configured to store, as initial information, the number of meshing parts of the crawler and information specifying the meshing part that is at a predetermined position, prior to the vehicle traveling. The rotation information acquisition unit is configured to acquire rotation information of the sprocket. The derivation unit is configured to derive, while the vehicle is traveling, information specifying the meshing part that is at the predetermined position, based on the initial information and the rotation information.

According to the above aspect, a meshing part of the crawler that is at a predetermined position can be specified while the vehicle is traveling, with a simple configuration. Various information about the crawler can thereby be derived.

An information acquisition apparatus according to a second aspect is the information acquisition apparatus according to the first aspect further including one or more sensors configured to be attachable to the vehicle, a characteristic acquisition unit and an anomaly detection unit. The characteristic acquisition unit is configured to acquire a detection value representing a characteristic of at least one of a rotation sound and a vibration of the crawler from the one or more sensors. The anomaly detection unit is configured to detect an anomaly of the crawler, based on the detection value detected by the one or more sensors.

According to the above aspect, an anomaly of the crawler can be detected while the crawler is operating, and maintenance of the crawler can be performed on a timely basis.

An information acquisition apparatus according to a third aspect is the information acquisition apparatus according to the second aspect, in which the predetermined position is a position at which the meshing part is configured to mesh with the tooth or the tooth base, and the anomaly detection unit is configured to associate the detection value and the information specifying the meshing part that is at the predetermined position, and estimate a position at which an anomaly has occurred in the crawler, using the associated detection value and information.

According to the above aspect, the task of carrying out a spot check on the crawler in the case where an anomaly is detected can be efficiently performed.

An information acquisition apparatus according to a fourth aspect is the information acquisition apparatus according to the second or third aspect, in which the one or more sensors include a sensor configured to detect a characteristic of sound.

An information acquisition apparatus according to a fifth aspect is the information acquisition apparatus according to any of the second to fourth aspects, in which the one or more sensors include a sensor configured to detect a characteristic of vibration.

An information acquisition apparatus according to a sixth aspect is the information acquisition apparatus according to any of the second to fifth aspects, in which the one or more sensors are configured to be attached to the sprocket or near the sprocket, and the characteristic acquisition unit is configured to acquire, from the one or more sensors, the detection value representing a characteristic of at least one of the rotation sound and the vibration that are produced when the crawler winds onto the sprocket.

An information acquisition apparatus according to a seventh aspect is the information acquisition apparatus according to any of the second to sixth aspects, in which the anomaly detection unit is configured to detect an anomaly of the crawler, according to at least one of a magnitude and a frequency characteristic of the detection value.

An information acquisition apparatus according to an eighth aspect is the information acquisition apparatus according to any of the second to seventh aspects, in which the anomaly detection unit is configured to detect an anomaly of the crawler, according to irregularity of the detection value in a time direction.

An information acquisition apparatus according to a ninth aspect is the information acquisition apparatus according to any of the second to eighth aspects, in which the anomaly detection unit is configured to detect an anomaly of the crawler, according to irregularity of an absolute value of a periodic peak of the detection value.

An information acquisition apparatus according to a tenth aspect is the information acquisition apparatus according to any of the first to ninth aspects, in which the derivation unit is configured to further derive at least one of the number of circulations of the crawler in a direction in which the vehicle moves forward and the number of circulations of the crawler in a direction in which the vehicle reverses, based on the initial information and the rotation information.

According to the above aspect, it becomes possible to derive further information relating to the crawler, such as the travel distance of the crawler.

An information acquisition apparatus according to an eleventh aspect is the information acquisition apparatus according to any of the first to tenth aspects, in which the information specifying the meshing part that is at the predetermined position is an identifier allocated to each of the meshing parts.

An information acquisition apparatus according to a twelfth aspect is the information acquisition apparatus according to the eleventh aspect, in which the identifier is allocated to each of the meshing parts starting from a reference position in a circumferential direction of the crawler.

An information acquisition apparatus according to a thirteenth aspect is the information acquisition apparatus according to any of the second to twelfth aspects further including an alert output unit. The alert output unit is configured to generate and output an alert notifying about an anomaly of the crawler. The alert includes information indicating a position at which the anomaly is estimated to have occurred.

An information acquisition system according to a fourteenth aspect includes a crawler configured to be wound around a rotationally driven sprocket to be connected to a rotation axle provided in a vehicle, the crawler having a meshing part configured to mesh with a tooth or a tooth base of the sprocket and being circulatorily driven in conjunction with rotation of the sprocket, and a control unit configured to acquire information relating to the crawler. The control unit includes a storage unit, a rotation information acquisition unit and a derivation unit. The storage unit is configured to store, as initial information, the number of meshing parts of the crawler and information specifying the meshing part that is at a predetermined position, prior to the vehicle traveling. The rotation information acquisition unit is configured to acquire rotation information of the sprocket. The derivation unit is configured to derive, while the vehicle is traveling, information specifying the meshing part that is at the predetermined position, based on the initial information and the rotation information.

A non-transitory computer-readable medium according to a fifteenth aspect is a non-transitory computer-readable medium storing an information acquisition program for acquiring information relating to a crawler configured to be wound around a rotationally driven sprocket connected to a rotation axle provided in a vehicle, the crawler having a meshing part configured to mesh with a tooth or a tooth base of the sprocket and being circulatorily driven in conjunction with rotation of the sprocket, the information acquisition program causing a computer to execute the following.

Storing, as initial information, the number of meshing parts of the crawler and information specifying the meshing part that is at a predetermined position, prior to the vehicle traveling.

Acquiring rotation information of the sprocket.

Deriving, while the vehicle is traveling, information specifying the meshing part that is at the predetermined position, based on the initial information and the rotation information.

According to the above aspects, regardless of whether a crawler mounted to a vehicle is communicable with an external device, the meshing part of the crawler at a predetermined position can be specified while the vehicle is traveling. It thereby becomes possible to acquire information such as the number of circulations and the travel distance of the crawler.

DETAILED DESCRIPTION OF THE PREFERRED EMBODIMENTS

Hereinafter, an information acquisition apparatus, program and system according to one embodiment of the present invention will be described, with reference to the drawings. The information acquisition apparatus according to the present embodiment is for detecting, in a vehicle to which a crawler is mounted, anomalies that occur in the crawler. A detailed description thereof will now be given.

Figure 1:
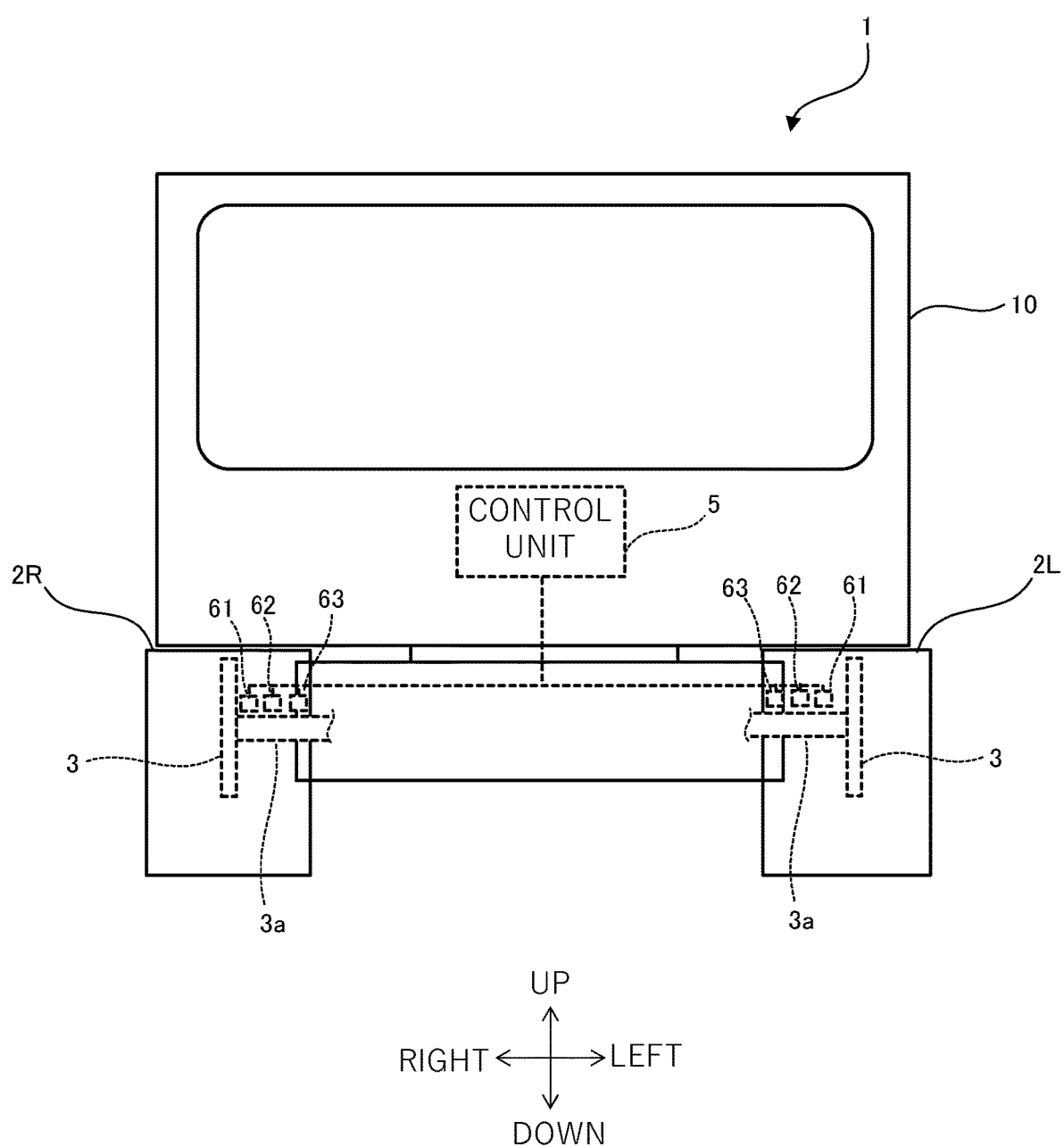
FIG. 1 is a schematic view of a vehicle equipped with a control unit serving as an information acquisition apparatus according to one embodiment of the present invention when viewed from the front side.
Figure 2:
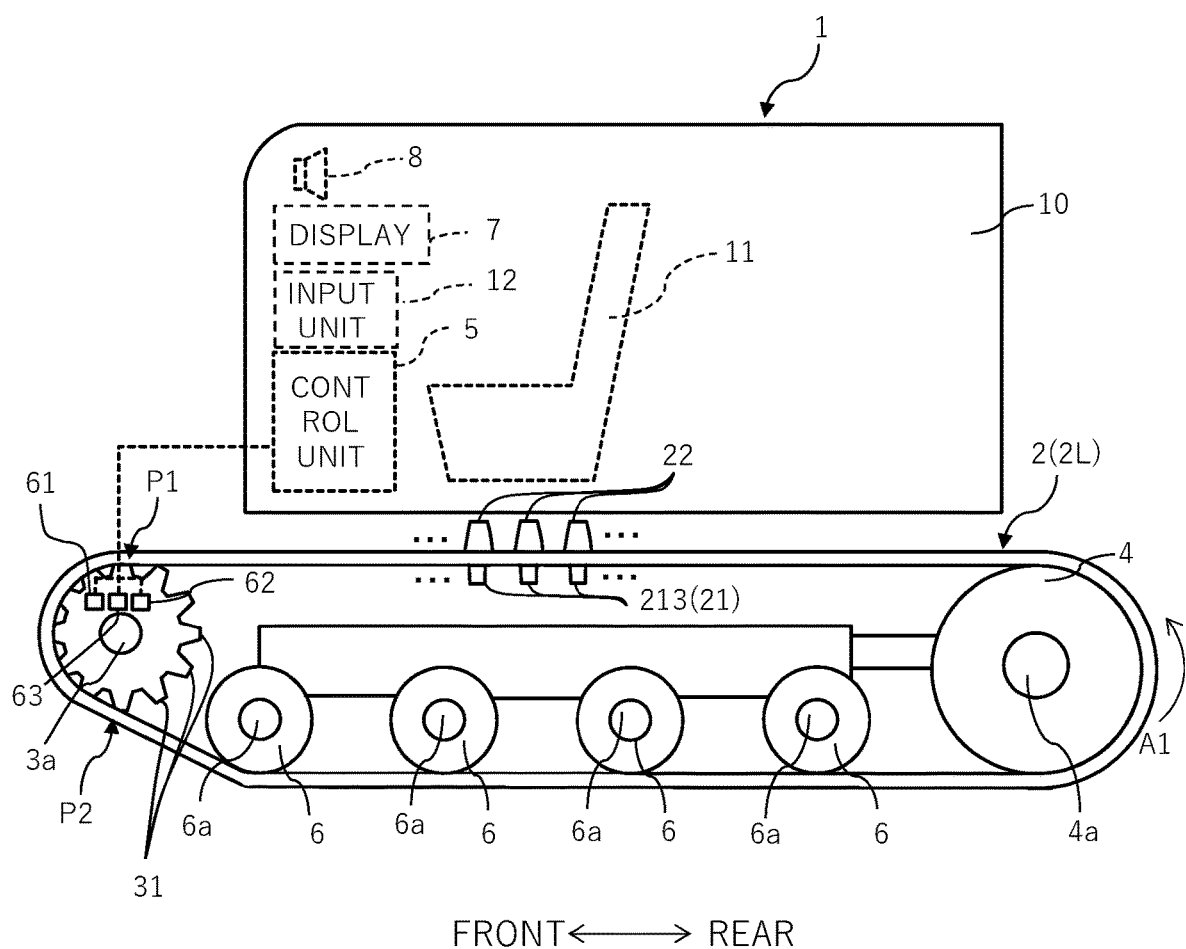
FIG. 2 is a schematic view of the vehicle when viewed from the left side.

1. Information Acquisition Apparatus and Configuration of Vehicle Provided Therewith FIGS. 1 and 2 are schematic diagrams showing a control unit 5 serving as an information acquisition apparatus according to the present embodiment installed in a vehicle 1. FIG. 1 is a diagram of the vehicle 1 when viewed from the front side (anterior side), and FIG. 2 is a diagram of the vehicle 1 when viewed from the left side. In these diagrams, part of the configuration that is not originally visible from the outside is shown with dotted lines as appropriate for reference purposes. Note that, in the description given here, up/down and left/right are defined based on directions in FIG. 1, and front/rear are defined based on directions in FIG. 2, unless specifically stated otherwise. Hereinafter, prior to description of the control unit 5 according to the present embodiment, the configuration of the vehicle 1 in which the control unit 5 is installed will be firstly described. Thereafter, the configuration of the control unit 5 will be described.

Overall Configuration of Vehicle

The vehicle 1 is a tracked vehicle, and is a vehicle that is mainly used in environments that cannot be appropriately traveled with tires. Examples of such environments include fields, forest roads, forests, snow, crushed stone quarries, deserts and other rough terrain, and examples of the vehicle 1 include vehicles such as combine harvesters, construction machinery vehicles such as excavators, snowmobiles, and large transport vehicles.

As shown in FIG. 1, the vehicle 1 is provided with a left-right pair of crawlers 2L and 2R. The vehicle 1 has a vehicle body 10 provided with a driver's seat 11, and the crawlers 2L and 2R are disposed separately on the left and right below the vehicle body 10, so as to extend in the front-rear direction.

As shown in FIG. 2, the vehicle 1 includes a left-right pair of sprockets 3 respectively connected to a left-right pair of shafts 3a, a left-right pair of idlers 4 respectively connected to a left-right pair of shafts 4a, and a plurality of left-right pairs of track rollers 6 respectively connected to a plurality of left-right pairs of shafts 6a. The crawler 2L on the left side is wound around the one sprocket 3 on the left side, the plurality of track rollers 6 on the left side, and the one idler 4 on the left side. Similarly, the crawler 2R on the right side is wound around the one sprocket 3 on the right side, the plurality of track rollers 6 on the right side, and the one idler 4 on the right side. The crawlers 2L and 2R are each annularly constituted in side view, with a continuous belt shape. The crawlers 2L and 2R have a similar configuration, and will thus be simply referred to below as crawlers 2, without specifically distinguishing therebetween. Hereinafter, the crawler 2 on one side and peripheral parts thereof (sprocket 3, idler 4, track rollers 6, first sensor 61, second sensor 62, rotation sensor 63) will be described, with this description applying to both the left and right crawlers 2L and 2R.

The sprocket 3 and the idler 4 are disposed separately in the front and rear. In the example in FIG. 2, the sprocket 3 is disposed on the front side and the idler 4 is disposed on the rear side, but the sprocket 3 may be disposed on the rear side and the idler 4 may be disposed on the front side. The track rollers 6 are arrayed in the front-rear direction between the sprocket 3 and the idler 4. The sprocket 3, the idler 4 and the track rollers 6 are respectively rotatably supported about the shafts 3a, 4a and 6a.

Sprockets

Figure 4:
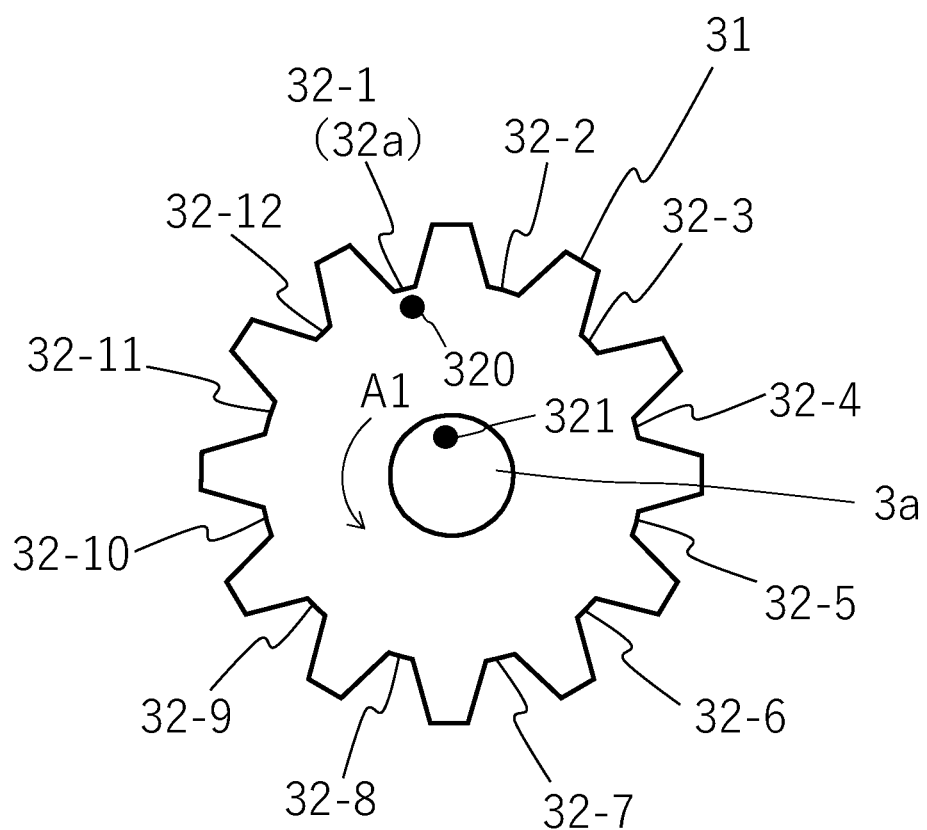
FIG. 4 is a diagram illustrating identifiers allocated to tooth bases of a sprocket.

FIG. 4 shows an example of the configuration of the sprocket. The sprocket 3 is a drive wheel, is coupled to a power device (not shown) such as an engine via the shaft 3a, and is rotationally driven about the shaft 3a with the shaft 3a as a rotation axle. Note that the left-right pair of shafts 3a are independent of each other, and the left-right pair of sprockets 3 are each rotationally driven independently. On the outer circumference of the sprocket 3, M number of teeth 31 are arrayed equidistantly in the circumferential direction that is based on the shaft 3a, and the crawler 2 is wound around these teeth 31. The crawler 2 is thereby circulatorily driven in side view, according to the rotation of the sprocket 3. Note that M=12 in the example shown in FIG. 4, but M is not limited thereto.

Tooth bases 32 of the sprocket 3 are surfaces located at the root of the teeth 31. The tooth bases 32 are equal in number to the teeth 31 and, similarly to the teeth 31, are arrayed equidistantly in the circumferential direction that is based on the shaft 3a. The tooth bases 32 are allocated identifiers that distinguish each thereof, and each of the tooth bases 32 can be specified by these identifiers. The identifiers may be consecutive numbers allocated so as to count the tooth bases 32 in a predetermined rotation direction, or may be symbols, a character string having a sequence, or the like, for example. In the present embodiment, as shown in FIG. 4, consecutive numbers from 1 to M are allocated as identifiers to each of the tooth bases 32, in descending order in the direction of an arrow A1.

Note that, when the sprocket 3 rotates in the direction of the arrow A1 based on the shaft 3a, it is assumed that the crawler 2 that is wound around the sprocket 3 rotates in a direction that moves the vehicle 1 forward. Conversely, when the sprocket 3 rotates in the opposite direction to the arrow A1 based on the shaft 3a, it is assumed that the crawler 2 that is wound around the sprocket 3 rotates in a direction that reverses the vehicle 1. Hereinafter, the tooth base 32 to which an identifier m ($1 \leq m \leq M$) is allocated may be referred to as a tooth base 32-$m$.

In the present embodiment, a configuration is adopted in which the user of the vehicle 1 is able to confirm the identifier allocated to each tooth base 32 from outside the vehicle 1. The identifier may be displayed on the corresponding tooth base 32 or in a vicinity thereof in the sprocket 3, for example. Also, a configuration may be adopted in which a reference tooth base 32a confirmable from outside the vehicle 1 is set in advance, and the user is able to confirm the identifier of each tooth base 32 by counting the tooth bases 32 in a predetermined rotation direction that is based on the shaft 3a starting from the reference tooth base 32a. The reference tooth base 32a may be set by adding a mark 320 visible from outside the vehicle 1 to one of the tooth bases 32, as shown in the example in FIG. 4, for example. Alternatively, as shown in the example in FIG. 4, if there is a feature 321 visible from outside the vehicle 1 and fixed to the shaft 3a, the sprocket 3 or the like, the reference tooth base 32a may be set utilizing the positional relationship with the feature 321.

When the tooth bases 32 are specifiable by identifiers, each of the teeth 31 are also specifiable. In other words, allocating an identifier to each of the tooth bases 32 is equivalent to allocating an identifier to each of the teeth 31. The identifiers allocated to the teeth 31 and tooth bases 32 are used for processing that will be described later.

Idlers

The idler 4 is a roller wheel, and a power device is not coupled to the shaft 4a. However, the idler 4 receives transmission of power from the crawler 2 that is circulatorily driven in side view according to the rotation of the sprocket 3, and is driven rotationally about the shaft 4a. This similarly applies to the track rollers 6, and a power device is not coupled to the shafts 6a. However, the track rollers 6 also receive transmission of power from the crawler 2 that is circulatorily driven in the side view according to the rotation of the sprocket 3, and are driven rotationally about the shafts 6a. The crawler 2 is wound so as to double back on the sprocket 3 and the idler 4 in the front-rear direction. The track rollers 6 are disposed on the opposite side to the road surface via the crawler 2, so as to push the crawler 2 against the road surface.

Crawlers

Figure 5:
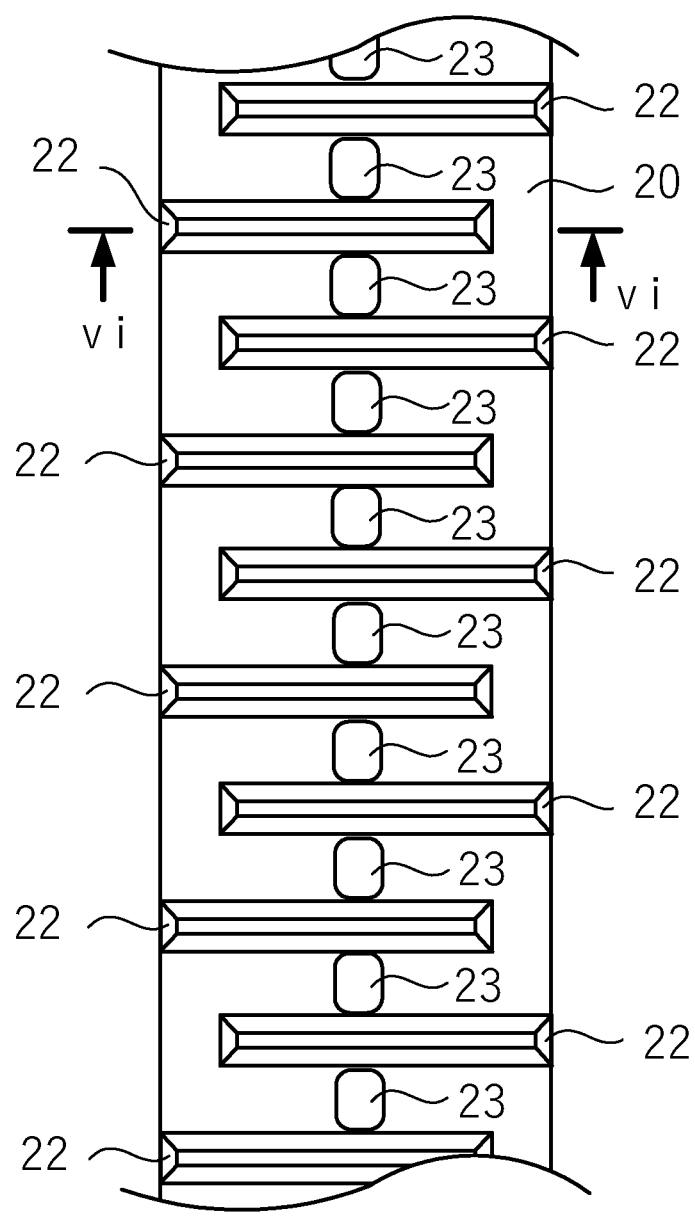
FIG. 5 is a diagram of part of a crawler when viewed from the outer circumference side.
Figure 6:
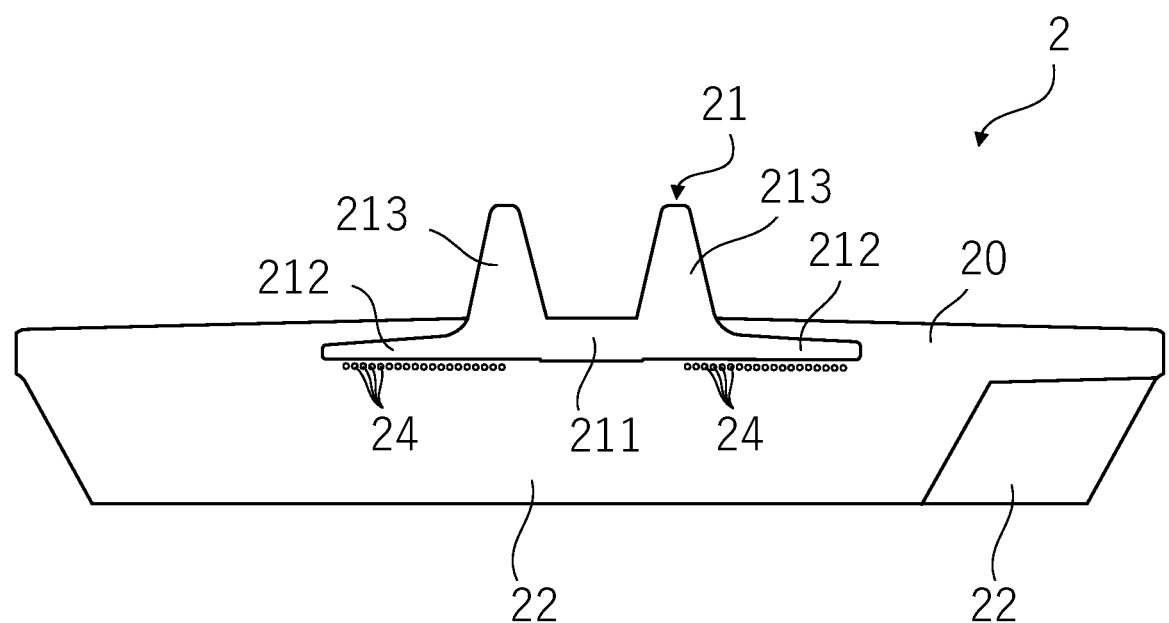
FIG. 6 is a cross-sectional view taken along a vi-vi line in FIG. 5.

The crawler 2 has a crawler body 20 constituted by an elastic body such as rubber. The crawler body 20 is annularly constituted in side view, with a continuous belt shape. FIG. 5 shows part of the crawler 2 from the outer circumference side. Note that, in the description given here, outside and inside respectively mean the outer side and the inner side of the ring of the crawler 2 wound around the sprocket 3, the idler 4 and the track rollers 6, unless specifically stated otherwise. Also, the circumferential direction means the direction in which the crawler 2 is circulatorily driven, unless specifically stated otherwise. FIG. 6 is a cross-sectional view taken long a vi-vi line in FIG. 5.

N number of metal cores 21 are arrayed in the crawler 2 at a predetermined interval in the circumferential direction. Note that, in FIG. 2, only three of these metal cores 21 are illustrated for reasons of simplification, but the metal cores 21 are actually arrayed equidistantly around the entire circumference of the crawler 2. As shown in FIG. 6, these metal cores 21 are at least partially embedded in the crawler body 20. The metal cores 21 are typically made of cast iron, wrought iron or resin. The metal cores 21 have a central portion 211 extending left-right, a left-right pair of wing-like portions 212 respectively extending left-right from both the left and right ends of the central portion 211, and a left-right pair of protruding portions 213 that both extend inward from both the left and right ends of the central portion 211. The central portion 211 and the left-right pair of wing-like portions 212 are embedded in the crawler body 20. The protruding portions 213 protrude toward the inner side of the ring of the crawler body 20.

As shown in FIG. 5, N number of openings 23 passing through the crawler body 20 are formed in the crawler body 20. The openings 23 are each located in the approximate center of the crawler main body 20 in the left-right direction, and disposed in the gap between any two metal cores 21 adjacent in the circumference direction. These openings 23 are configured to receive the teeth 31 disposed on the outer circumferential surface of the sprocket 3. On the other hand, the metal cores 21 are configured to receive the tooth bases 32 of the sprocket 3, on the inner surface located in the gap between the left-right pair of protruding portions 213. That is, meshing parts that mesh with the teeth 31 of the sprocket 3 correspond to the openings 23, and meshing parts that mesh with the tooth bases 32 of the sprocket 3 correspond to the metal cores 21. Due to the teeth 31 meshing with the openings 23 and the tooth bases 32 meshing with the metal cores 21, the crawler 2 winds onto the sprocket 3, and the crawler 2 is provided with power for circulating from the sprocket 3 according to the rotation of the sprocket 3.

When the crawler 2 is circulatorily driven normally in a given direction by the sprocket 3, the position at which the crawler 2 starts winding onto the sprocket 3 and the position at which the crawler 2 starts separating from the sprocket 3 will be generally constant relative to the shaft 3a. In other words, the position at which the metal cores 21 and tooth bases 32 newly mesh, the position at which the openings 23 and teeth 31 newly mesh, the position at which the meshed metal cores 21 and tooth bases 32 separate, and the position at which the meshed openings 23 and teeth 31 separate are each generally constant based on the shaft 3a. In the present embodiment, when the crawler 2 is circulatorily driven normally in the direction of the arrow A1, the metal cores 21 and tooth bases 32 newly mesh at a position P1 shown in FIG. 2 or in the vicinity of the position P1, and the metal cores 21 and tooth bases 32 separate at a position P2 or in a vicinity of the position P2. Also, in the present embodiment, when the crawler 2 is circulatorily driven normally in the opposite direction to the arrow A1, the metal cores 21 and tooth bases 32 newly mesh at the position P2 or in a vicinity of the position P2, and the metal cores 21 and tooth bases 32 separate at the position P1 or in a vicinity of the position P1.

Figure 7A:
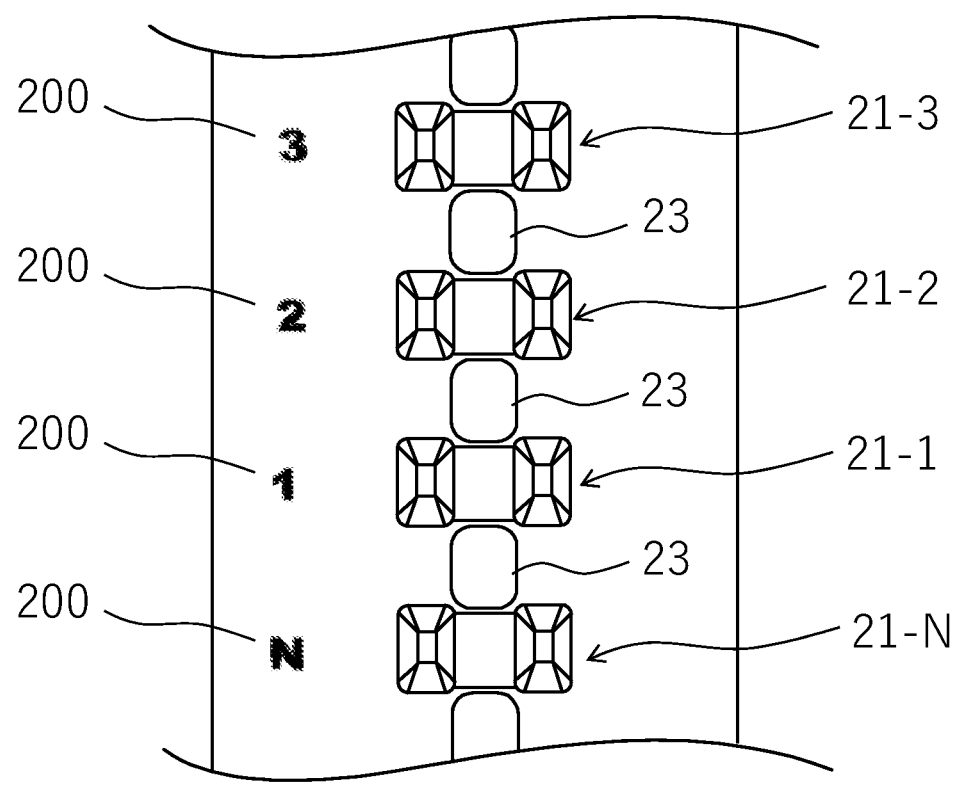
FIG. 7A is a diagram showing an example of part of the crawler when viewed from the inner circumference side.
Figure 7B:
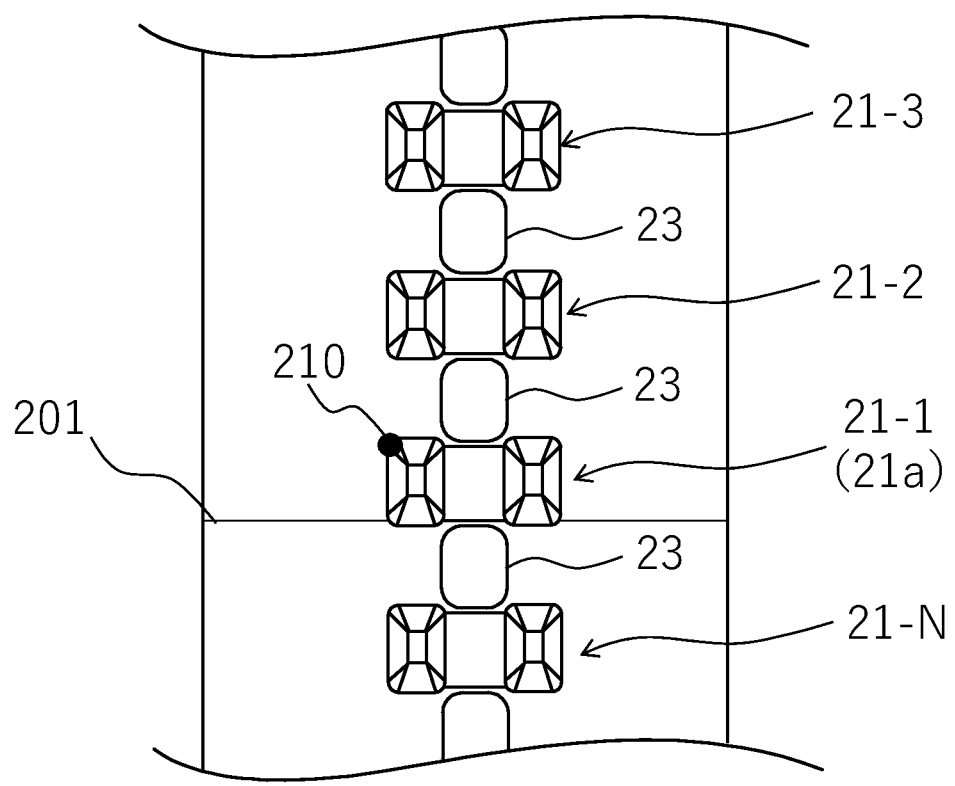
FIG. 7B is a diagram showing another example of part of the crawler when viewed from the inner circumference side.
Figure 8:
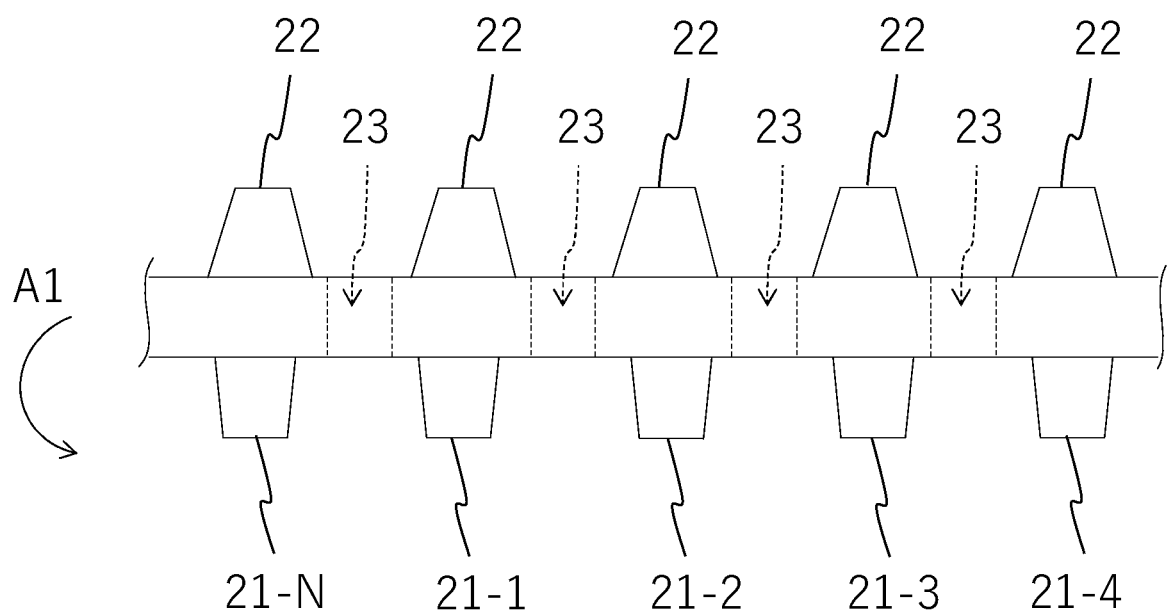
FIG. 8 is a diagram of part of the crawler when viewed from the side.

FIGS. 7A and 7B are partial plan views of the inner side of the crawler 2, and FIG. 8 is a partial side view of the crawler 2 in which the vicinity of the metal cores 21 is enlarged. The metal cores 21 are allocated identifiers that distinguish each thereof, and the metal cores 21 can be individually specified by these identifiers. The identifiers may be consecutive numbers allocated so as to count the metal cores 21 in a predetermined rotation direction, for example, or may be character symbols or the like. Note that consecutive numbers allocated to the metal cores 21 are also commonly called link numbers. In the present embodiment, the metal cores 21 are allocated consecutive numbers from 1 to N as identifiers in descending order in the direction of the arrow A1 in FIGS. 2 and 8 that is based on the shaft 3a. Hereinafter, the metal core 21 to which an identifier n ($1 \leq n \leq N$) is allocated may be referred to as a metal core 21-$n$.

The crawler 2 is configured such that the identifiers allocated to the metal cores 21 can be acquired from outside the vehicle 1. In the present embodiment, as shown in the example in FIG. 7A, the identifiers of the corresponding metal cores 21 are displayed with markings 200 formed on the crawler 2. The markings 200 may be formed in any region of the crawler 2 that is visible to the user of the vehicle 1 from outside the vehicle 1.

Also, a configuration may be adopted in which the crawler 2 has a reference metal core 21a visible from outside the vehicle 1, and the user is able to confirm the identifier of each metal core 21 by counting the metal cores 21 in a predetermined rotation direction starting from the reference metal core 21a. The reference metal core 21a may be set by adding a mark 210 visible from outside the vehicle 1 to one of the metal cores 21, as shown in the example in FIG. 7B, or may be set utilizing the positional relationship with a feature 201 visible from outside the vehicle 1. The feature 201 may be a mark formed in the rubber of the crawler body 20 or may be a marking indicating a size or the like, for example. Also, the feature 201 may be a join in the rubber constituting the crawler body 20, as shown in the example in FIG. 7B. Usually, the rubber crawler body 20 is manufactured through multiple iterations of a vulcanization process. One or more joins in the rubber thus appear in the crawler body 20. The joins are annularly formed in a plane orthogonal in the longitudinal direction of the crawler main body 20, and are readily visible when moving in conjunction with the rotation of the crawler 2, and thus can be utilized in setting of the reference metal core 21a.

Also, the crawler 2 may be configured such that the identifiers allocated to the metal cores 21 are acquired by an external device, utilizing an RFID system. Specifically, a configuration may be adopted in which, near each metal core 21, an IC tag storing the identifier of the metal core 21 is embedded inside the crawler body 20, and the identifiers of the metal cores 21 are acquired via a reading device capable of reading the information of the IC tags. The reading device may be a portable device communicably connected to the control unit 5 and configured to read the information of an IC tag in proximity thereto. In this case, the user of the vehicle 1 may move the reading device close to a metal core 21 that is at a predetermined position and cause the reading device to read the identifier stored in the IC tag corresponding to that metal core 21. Also, the reading device may be a device fixed at a predetermined position of the vehicle 1, and configured to read the identifier stored in the nearest IC tag and transmit the read identifier to the control unit 5. In this case, the reading device may be configured to automatically read the identifier of the nearest IC tag, at a time such as when the electrical system of the vehicle 1 is turned on.

Note that when the metal cores 21 are specifiable by identifiers, each of the openings 23 are also specifiable. In other words, allocating an identifier to each of the metal cores 21 is equivalent to allocating an identifier to each of the openings 23. The identifiers allocated to the metal cores 21 and openings 23 are used for processing that will be described later.

As shown in FIGS. 2, 4 and 5, a large number of lugs 22 are arrayed in the crawler 2 at a predetermined interval in the circumferential direction. These lugs 22 stand outward from the outer circumferential surface of the crawler body 20. Note that, in FIG. 2, only three lugs 22 are illustrated for reasons of simplification, but the lugs 22 are actually arrayed equidistantly around the entire circumference of the crawler 2.

The lugs 22 are constituted by an elastic body such as rubber, similarly to the crawler main body 20, and, in the present embodiment, are integrally constituted with the crawler main body 20. The lugs 22 are members that contact the road surface. As shown in FIG. 5, there are lugs 22 that extend rightward from the left edge of the crawler body 20 without reaching the right edge, and lugs 22 that extends leftward from the right edge without reaching the left edge, with these lugs 22 being arrayed alternately in the circumferential direction.

A large number of tensile cords 24 extending around the entire circumference in the circumferential direction are embedded in the crawler main body 20, together with the central portions 211 and wing-like portions 212 of the metal cores 21. A large number of these tensile cords 24 are disposed separately on the left and right of the openings 23, on the outer circumference side of the left-right pairs of wing-like portions 212. These tensile cords 24 are members for providing tensile strength to the crawler body 20 or regulating the elongation of the crawler body 20. The tensile cords 24 are constituted by steel cords or piano wire, for example.

Rotation Sensors

As shown in FIGS. 1 and 2, a left-right pair of rotation sensors 63 are attached to the vehicle 1. The rotation sensors 63 are sensors for detecting rotation information of the sprocket 3, and output a rotation pulse signal corresponding to the tooth 31 and tooth base 32 of the sprocket 3 that pass through a predetermined position. The rotation sensors 63 are connected to the control unit 5 communicably by cable or wirelessly, and the rotation information detected by each rotation sensor 63 is communicated to the control unit 5 in real time. The rotation sensors 63 are not particularly limited as long as they are sensors that output a rotation pulse signal corresponding to the tooth 31 or tooth base 32 of the sprocket 3, and known sensors can be employed. More specifically, a geared rotary encoder having gears that rotate in conjunction with the shaft 3a, an optical encoder, a magnetic encoder, an electromagnetic pickup encoder or the like can be used. The rotation sensors 63 may be sensors that are able to detect not only the teeth 31 and tooth bases 32 of the sprocket 3, but also the rotation direction of the sprocket 3 or the number of rotations of the sprocket 3.

Sound Sensors

Also, a left-right pair of first sensors 61 are attached to the vehicle 1. The first sensors 61 are sensors for detecting characteristics of the rotation sound of the crawler 2 during travel, and, while not limited thereto, are microphones that detect sound waves in the present embodiment. Also, in the present embodiment, the first sensors 61 are attached near the sprocket 3, and, in particular, are fixed to a bearing near the sprocket 3. The first sensors 61 are thereby able to detect characteristics of the rotation sound produced when the crawler 2 winds onto the sprocket 3. This rotation sound includes the sound of contact between the sprocket 3 and the crawler 2, for example. The first sensors 61 are connected to the control unit 5 communicably by cable or wirelessly, and transmits detection values representing the detected characteristics of the rotation sound to the control unit 5.

Vibration Sensors

Furthermore, a left-right pair of second sensors 62 are also attached to the vehicle 1. The second sensors 62 are sensor for detecting characteristics of the vibration of the crawler 2 during travel, and, while not limited thereto, are acceleration sensors in the present embodiment. In the present embodiment, the second sensors 62 are also attached near the sprocket 3, and, in particular, are fixed to a bearing near the sprocket 3. The second sensors 62 are thereby able to detect characteristics of the vibration produced when the crawler 2 winds onto the sprocket 3. This vibration includes vibration produced by contact between the sprocket 3 and the crawler 2. The second sensors 62 are also connected to the control unit 5 communicably by cable or wirelessly, and transmit detection values representing the detected characteristics of the vibration to the control unit 5.

Control Unit

Figure 3:
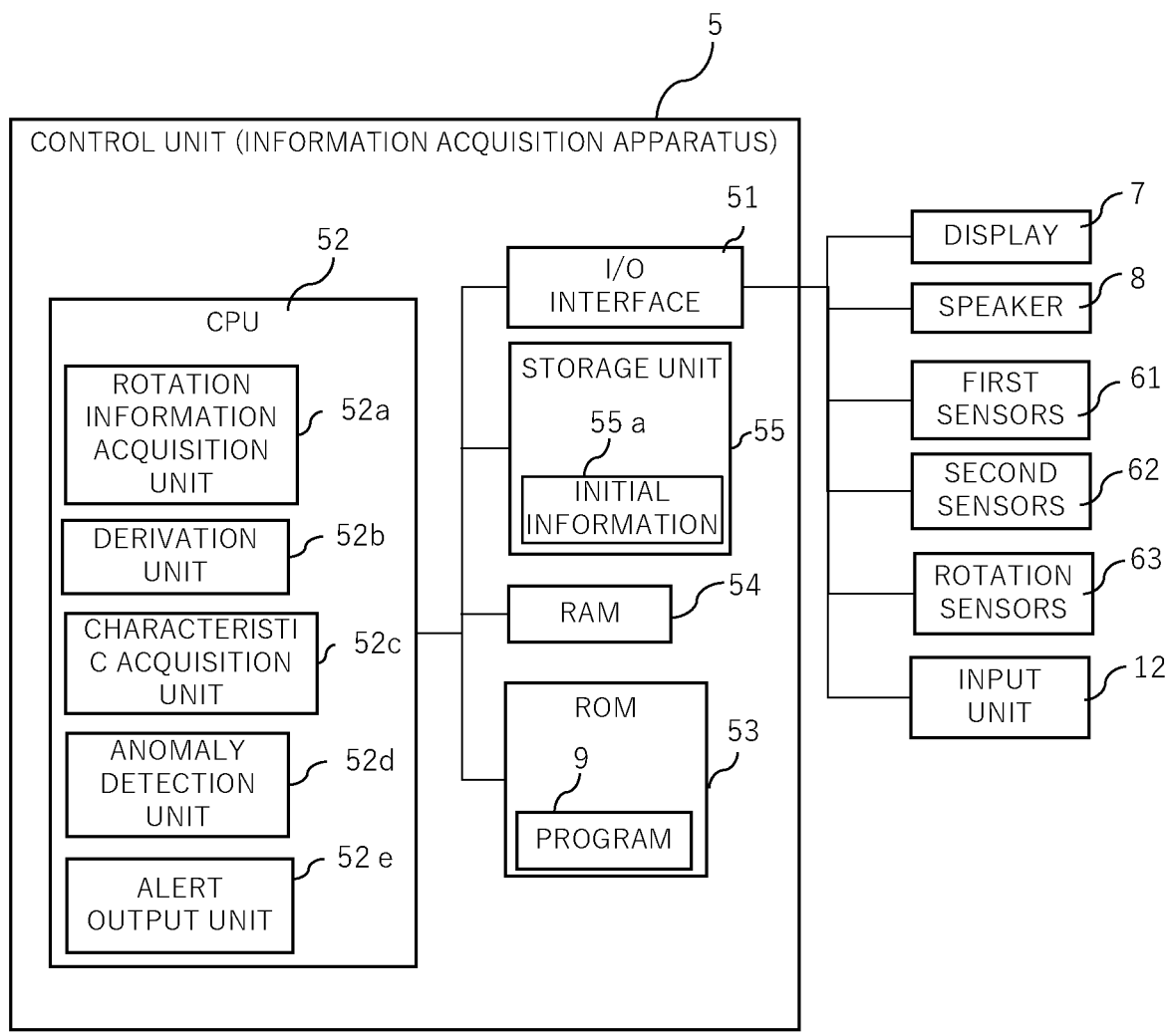
FIG. 3 is a block diagram showing an electrical configuration of the control unit serving as an information acquisition apparatus according to one embodiment of the present invention.

The control unit 5 for controlling travel of the vehicle 1 is installed in the vehicle body 10. FIG. 3 is a block diagram showing the electrical configuration of the control unit 5. The control unit 5 is a general-purpose computer in terms of hardware, and, as shown in FIG. 3, has an I/O interface 51, a CPU 52, a ROM 53, a RAM 54 and a storage unit 55. The I/O interface 51 is a communication device for communicating with the first sensors 61, the second sensors 62 and the rotation sensors 63, as well as external devices such as a display device 7, a speaker 8 and an input unit 12 which will be described later. The ROM 53 stores a program 9 for controlling the operations of the units of the vehicle 1. The program 9 includes an information acquisition program according to the present embodiment.

The CPU 52 operates in a virtual manner as a rotation information acquisition unit 52a, a derivation unit 52b, a characteristic acquisition unit 52c, an anomaly detection unit 52d and an alert output unit 52e, by reading out the program 9 from the ROM 53 and executing the read program 9. The operations of the units 52a to 52e will be described in detail later. The storage unit 55 is constituted by a rewritable nonvolatile memory such as a hard disk or a flash memory, and has an area for storing initial information 55a which will be described later. The storage location of the program 9 may be the storage unit 55 rather than the ROM 53. The RAM 54 and the storage unit 55 are used for computational operations of the CPU 52 as appropriate.

Furthermore, in the case where the control unit 5 is communicably connected to a network such as the Internet, the information acquisition program according to the present embodiment may be realized as software that is provided via a cloud service. Also, in the case where the control unit 5 is communicably connected to a network such as the Internet, information that is acquired by the control unit 5 may be saved to online storage that is provided via the network. In this case, information saved in the online storage may also be acquired as appropriate by terminal devices other than the control unit 5 that are communicably connected to the network, in addition to the control unit 5.

Other Configuration

The display device 7 is able to output various information including alerts to the user (primarily the driver), and can be realized in any mode such as a liquid crystal display element, a liquid crystal monitor, a plasma display and an organic EL display, for example. The attachment position of the display device 7 can be selected as appropriate, and the display device 7 is preferably provided in a position that is readily visible to the driver, such as in front of the driver's seat 11, for example. In the case where a monitor screen is used as the display device 7, alerts can be configured as icons, graphics and character information that are displayed on the monitor screen.

The speaker 8 is also able to output various information including alerts to the user, similarly to the display device 7. The attachment position of the speaker 8 can be selected as appropriate, and the speaker 8 is preferably provided in a position where the output sound is readily audible to the user sitting in the driver's seat, such as above the driver's seat 11, for example.

The input unit 12 is a unit through which the user is able to input information to the control unit 5, and can be realized in any mode, such as a keyboard, buttons, an input pad, and a touch panel display integrated with the display device 7. The attachment position of the input unit 12 can be selected as appropriate, and the input unit 12 is preferably provided in a position that is readily operable by the user sitting in the driver's seat, such as above the driver's seat 11, for example.

2. Flow of Information Acquisition Processing Including Anomaly Detection

Hereinafter, processing that is performed by the control unit 5 will be described. The vehicle 1 is equipped with the function of executing information acquisition processing for specifying the identifier of a metal core 21 of the crawler 2 that is at a predetermined position based on the shaft 3a, while the vehicle 1 is traveling. The information acquisition processing of the present embodiment includes anomaly detection processing for detecting anomalies of the crawler 2, and is able to associate an anomaly of the crawler 2 detected by the anomaly detection processing with a metal core 21.

Precursor

As for anomalies of the crawler 2, it is conceivable that adhesion due to an adhesive or the like between the metal cores 21 and the crawler body 20 constituted by an elastic body such as rubber decreases due to factors such as rusting of the metal cores 21 or deterioration of the crawler body 20, and the holding force exerted on the metal cores 21 by the crawler body 20 decreases, for example. It is also conceivable that the large number of tensile cords 24 are at least partially cut, and an appropriate tensile force no longer acts on the crawler body 20, for example. When such anomalies occur inside the crawler 2, the crawler 2 eventually fails. Specifically, problems occur such as the metal cores 21 or other components dropping out of the crawler main body 20 or the crawler body 20 being cut, for example, and the vehicle 1 eventually becomes unable to travel. Furthermore, even in the case where the crawler 2 has not deteriorated, for example, it is conceivable that abnormal tension occurs in the crawler main body 20 or the tensile cords 24 due to foreign matter such as mud or dirt clogging the openings 23 of the crawler body 20, resulting in breakage of the metal cores 21 or cutting of the tensile cords 24. The crawler 2 is also usually used in places with poor footing, and it is extremely troublesome if the crawler suddenly fails. That is, the task of replacing the crawler 2 can require a lot of work, and can also require heavy equipment such as a crane. Failure of the crawler 2 also results in a long downtime.

Thus, while it is important to appropriately detect anomalies of the crawler 2 from the viewpoint of workability, even in the case where an anomaly of the crawler 2 is detected, a visual inspection needs to be carried out to specify the position where the anomaly of the crawler 2 has occurred. However, the downtime can be further extended due to this inspection, and the region where the anomaly has occurred may be visually difficult to find depending on the type of anomaly. In this regard, in the vehicle 1 of the present embodiment, anomalies of the crawler 2 can be detected in a mode in which the anomalies are associated with a position of the crawler 2 in the circumferential direction, by a function of executing information acquisition processing and anomaly detection processing in association with each other. In other words, in the vehicle 1, not only are anomalies of the crawler 2 detected, but the region of the crawler 2 where the anomalies have occurred can be estimated.

The information acquisition processing is executed with the control unit 5, the initial information that is stored therein, and the rotation sensor 63 that is connected to the control unit 5. Specifically, the control unit 5 specifies metal cores 21 that pass through a predetermined position, based on information on the metal core 21 that was at the predetermined position prior to the vehicle 1 traveling and the detection value of the rotation sensor 63 that is acquired while the vehicle 1 is traveling. Note that, according to the information acquisition processing, not only does it become possible to estimate the region where an anomaly of the crawler 2 has occurred, but it also becomes possible to acquire information relating to the travel of the crawler 2, such as the cumulative number of circulations of the crawler 2 or the cumulative travel distance of the crawler 2, for example. Acquired information relating to the travel of the crawler 2 can be utilized for predicting the life of the crawler 2, for example.

The anomaly detection processing is executed with the control unit 5 and the first sensor 61 and second sensor 62 that are connected thereto. Specifically, when anomalies such as described above occur in the crawler 2, the rotation sound and vibration of the crawler 2 during travel change compared to normal operation. Therefore, characteristics of the rotation sound and vibration of the crawler 2 during travel are respectively detected by the first sensor 61 and second sensor 62, and the control unit 5 detects anomalies based on the detection values at this time. Note that the rotation sound and vibration corresponding to the detection values of the first sensor 61 and second sensor 62 are mainly those that occur at the position where the crawler 2 starts winding onto the sprocket 3. In view of this, the control unit 5 of the present embodiment performs the information acquisition processing for specifying the metal cores 21 and tooth bases 32 that mesh at the position P1 or position P2 in parallel with the anomaly detection processing.

Processing Flow

Figure 9:
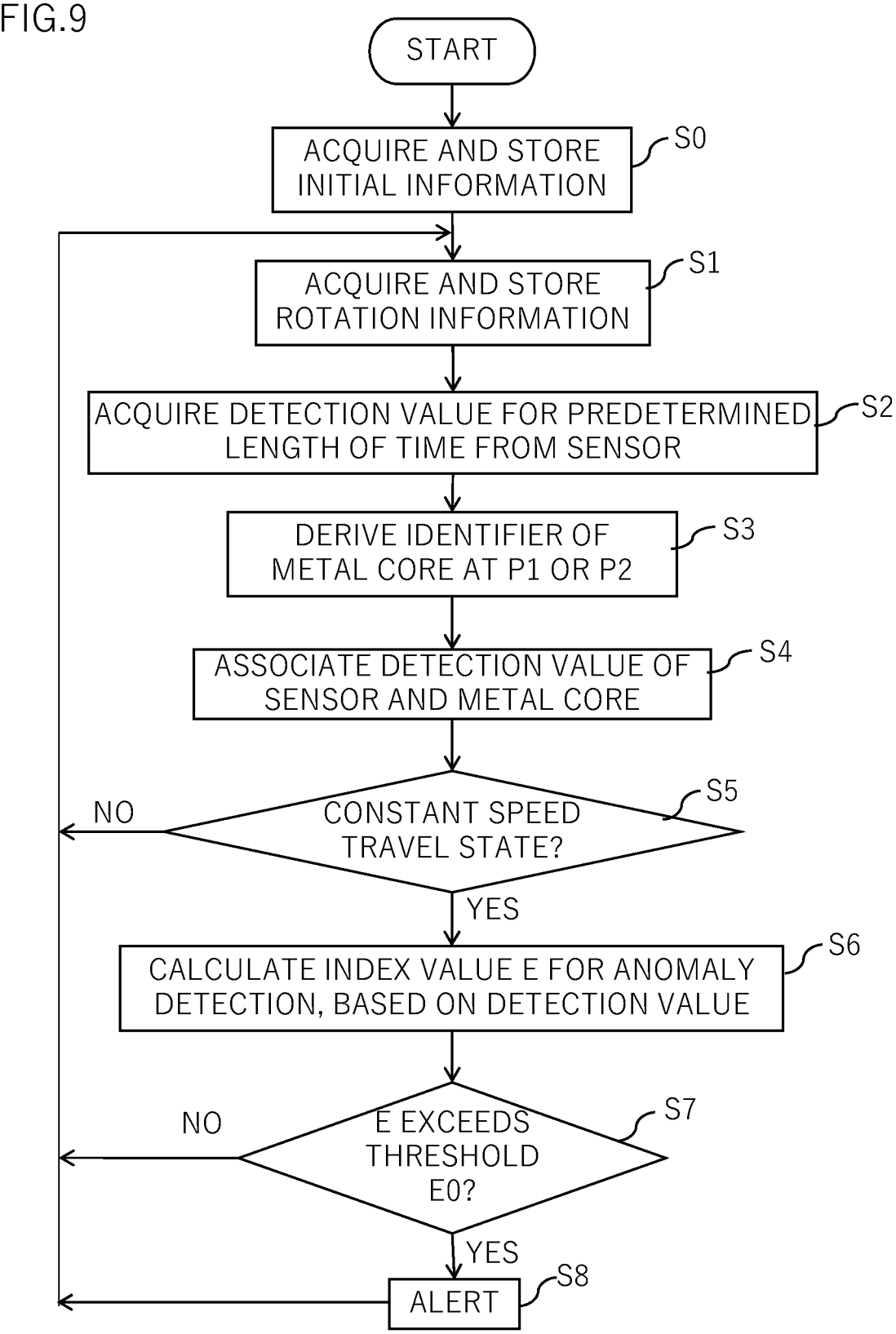
FIG. 9 is a flowchart showing the flow of information acquisition processing according to one embodiment of the present invention.

FIG. 9 is a flowchart showing the flow of information acquisition processing according to the present embodiment. Step S0 that is included in this processing is performed prior to the vehicle 1 traveling, and steps S1 to S8 are repeatedly executed continuously while the vehicle 1 is traveling. However, steps S1 to S8 may, for example, be executed periodically (once a day, etc.) while the vehicle 1 is traveling after step S0 is performed, or may be executed once every time the electrical system of the vehicle 1 is turned on.

In step S0, initial information is acquired and stored by the control unit 5. In the present embodiment, the user inputs initial information to the control unit 5 via the input unit 12. The information that is input as initial information is information specifying the metal core 21 that is meshing at the position P1 or P2 prior to the vehicle 1 traveling, and, in the present embodiment, is the identifier allocated to the metal core 21. The user is able to select either the position P1 or position P2, according to the direction in which the vehicle 1 will subsequently travel. Specifically, the user selects the position P1 in the case of moving the vehicle 1 forward and the position P2 in the case of reversing the vehicle 1. The identifier of the metal core 21 can be confirmed by the user observing the crawler 2 and the sprocket 3 while stationary, and input to the control unit 5. For example, if the tooth and tooth base meshing at the position P1 or P2 are the metal core 21-47 and the tooth base 32-4, the identifier of the metal core 21 that is input as initial information is "47".

In the case where the identifiers of the metal cores 21 are stored in IC tags embedded in the crawler body 20 and are readable by a reading device that is communicably connected to the control unit 5, the control unit 5 may acquire the identifiers allocated to the metal cores 21 via this reading device. For example, in the case where the reading device is a portable device, the control unit 5 is able to acquire initial information, by the user reading the identifier of the metal core 21 that is at the position P1 or position P2 using the reading device and transmitting the read identifier to the control unit 5. Also, in the case where the reading device is configured to automatically read the identifier of the nearest metal core 21 and transmit the read identifier to the control unit 5, the control unit 5 may be configured to deduce the identifier of the metal core 21 at the position P1 or P2 as initial information from the transmitted identifier of the metal core 21. The identifier of the metal core 21 at the position P1 or P2 can be deduced, by storing the number of metal cores 21 that exist between a predetermined position at which the reading device reads identifiers and the position P1 or P2 in the storage unit 55 or the like in advance and counting the number thereof from the identifier of the metal core 21 that was read.

The user also inputs the number (N) of metal cores of the crawler 2 and the number (M) of teeth of the sprocket 3 to the control unit 5, as other initial information. The control unit 5 saves the input initial information to the storage unit 55 as the initial information 55a. Furthermore, the control unit 5 may be configured to acquire and store the identifier of the tooth base 32 that is meshing with the metal core 21 at the position P1 or P2, as other initial information. In this case, in the example given above, the user is able to input "4" to the control unit 5 as the identifier of the tooth base 32.

Step S1 starts at the same time as the vehicle 1 starts traveling, after step S0. In step S1, the rotation information acquisition unit 52a acquires a rotation pulse and rotation direction that are output by the rotation sensor 63 via the I/O interface 51. The rotation direction represents either the direction of the arrow A1 in FIG. 2 or the opposite direction to the arrow A1. The acquired rotation pulse and rotation direction are temporarily saved to the RAM 54 or saved to the storage unit 55 by the rotation information acquisition unit 52a.

Also, step S2 starts when the vehicle 1 starts traveling, after step S0. In step S2, the characteristic acquisition unit 53c acquires a detection value representing characteristics of the rotation sound of the crawler 2 from the first sensor 61 via the I/O interface 51. Also, at the same time, the characteristic acquisition unit 53c acquires a detection value representing characteristics of the vibration of the crawler 2 from the second sensor 62 via the I/O interface 51. Here, time series data of the detection value for a predetermined length of time is acquired. The acquired time series data is temporarily saved to the RAM 54 or saved to the storage unit 55 by the characteristic acquisition unit 53c. The first sensor 61 and second sensor 62 are respectively able to detect sound and vibration produced by the meshing of the sprocket 3 and the crawler 2. Accordingly, during normal operation, the wave peak of the detection value will be repeatedly detected at a generally constant time interval, according to the rotation interval of the metal cores 21 that are equidistantly arrayed.

In step S3, the derivation unit 52b derives the identifier of the metal core 21 that is at the position P1 or position P2 and the number of circulations C1 of the crawler 2, based on the rotation information and initial information 55a acquired in step S1. First, the derivation unit 52b calculates a number D of the tooth bases 32 that have passed through the position P1 or position P2 from the rotation pulse acquired in step S1. Assuming that the crawler 2 is circulatorily driven normally, the number D matches the number of metal cores 21 that have passed through the position P1 or position P2. The derivation unit 52b divides D by the N number of the metal cores 21 and obtains a quotient C1 and a remainder R1. C1 is temporarily saved to the RAM 54 or saved to the storage unit 55 by the derivation unit 52b as the number of circulations of the crawler 2. Also, the derivation unit 52b derives the identifier of the metal core 21 at the position P1 or P2, by counting R1 of the metal cores 21 in the rotation direction, starting from the metal core 21 specified by the initial information 55a. The identifier of the metal core 21 specified at the position P1 or P2 is temporarily saved to the RAM 54 or saved to the storage unit 55 by the derivation unit 52b.

For example, if D=64 and the N number of metal cores 21 is 50, C1=1, R1=14. The number of circulations C1 of the crawler 2 is thereby derived to be 1. When the crawler 2 circulates in the direction of the arrow A1, the metal cores 21 sequentially pass through the position P1 such that the identifiers are in ascending order. The derivation unit 52b counts 14 metal cores 21 in ascending order starting from the metal core 21-47 that is specified as the initial information 55a, and specifies the metal core 21-11. That is, the metal core that is meshing with the tooth base 32 at the current position P1 is derived to be the metal core 21-11 and the identifier thereof is derived to be 11. Similarly, when the crawler 2 circulates in the opposite direction to the arrow A1, the metal cores 21 sequentially pass through the position P2 such that the identifiers are in descending order. The derivation unit 52b counts 14 metal cores 21 in descending order starting from the metal core 21-47 that is specified as the initial information 55a, and specifies the metal core 21-33. That is, the metal core that is meshing with the tooth base 32 at the current position P2 is derived to be the metal core 21-33 and the identifier thereof is derived to be 33.

In step S4, the anomaly detection unit 52d associates the time series data of the detection values of the first sensor 61 and second sensor 62 acquired in step S2 with the identifier of the metal core 21 derived in step S3. In other words, the anomaly detection unit 52d synchronizes the wave peak of the detection values of the first sensor 61 and second sensor 62 with the derived identifier of the metal core 21 on the same time series. This synchronization may be performed based on the time at which the vehicle 1 starts traveling, or may be performed based on a trigger signal that is output periodically. The trigger signal may be a signal that is output every time the shaft 3a completes one rotation, for example. As such a trigger signal, a marker can be installed on the shaft 3a, for example, and a detection signal of the marker that is detected by a detector (not shown) installed in the vehicle 1 and connected to the control unit 5 can be utilized. However, the method of associating the time series data of the detection values of the first sensor 61 and second sensor 62 with the identifier of a metal core 21 is not particularly limited, and any method can be employed.

In the following step S5, the anomaly detection unit 52d judges whether the vehicle 1 is currently in a constant travel speed state. Specifically, the anomaly detection unit 52d acquires an acceleration a of the vehicle 1 in the current direction of travel, and, if the magnitude thereof is less than or equal to a predetermined value, judges that the vehicle 1 is in the constant travel speed state, and the processing proceeds to step S6. On the other hand, if it is judged in step S5 that the vehicle 1 is not in the constant travel speed state, the processing returns to step S1. Note that various methods are known as a method of acquiring the acceleration a of the vehicle 1, and, for example, the acceleration a can be acquired from an acceleration sensor (not shown) installed in the vehicle 1 and connected to the control unit 5. However, the method of acquiring the acceleration a of the vehicle 1 is not particularly limited, and any method can be employed.

In step S6, the anomaly detection unit 52d calculates an index value E for anomaly detection, based on the detection value acquired in step S1. In the present embodiment, various index values E which will be described below are calculated.

First, an index value representing the magnitude of the detection value is calculated as an index value E. Such an index value E is able to represent the magnitude of the rotation sound when based on the detection value from the first sensor 61, and is able to represent the magnitude of the vibration when based on the detection value from the second sensor 62. In both cases, the respective index value E is associated with the identifier of the metal core 21 derived in step S3. The anomaly detection unit 52d may calculate, as an index value E for each metal core 21, the average value of the detection values acquired while the crawler 2 circulates a predetermined number of times in the constant speed travel state of the vehicle 1, for example.

Also, an index value representing the irregularity of the detection value in the time direction is calculated as an index value E. As described above, during normal operation, the wave peak of the detection value is repeatedly detected at a generally constant time interval according to the rotation interval of the teeth 31 and metal cores 21 that are arrayed equidistantly, but this rhythm breaks down during anomalous operation. Therefore, the index value E representing the irregularity of the detection value in the time direction is able to represent whether a constant rhythm of the rotation sound has broken down when based on the detection value from the first sensor 61, and whether a constant rhythm of the vibration has broken down when based on the detection value from the second sensor 62. At this time, for example, time intervals t1, t2, . . . , tN of the peak of the detection value that is represented in the time series data of the detection value for a predetermined length of time, such as one rotation of the crawler 2, can all be calculated while being corresponded to the metal cores 21. t1 can then be subtracted from each of the time intervals t2, t3, . . . , tN, and the ratios of differences to the reference value t1, that is, (t2−t1)/t1, (t3−t1)/t1, . . . , (tN−t1)/t1, can all be calculated and saved to the storage unit 55 or temporarily saved to the RAM 54. The previous value sequence of these ratios can then be respectively subtracted from the current value sequence of these ratios, and the resultant absolute values can be taken as index values E respectively corresponding to the metal cores 21.

Furthermore, an index value representing the irregularity of the absolute value of the detection value is calculated as an index value E. During normal operation, the absolute value of the wave peak of the detection value that is repeatedly detected at a generally constant time interval generally falls within a certain range. However, when the adhesive strength of the metal cores 21 on the crawler body 20 decreases, the force acting on the metal cores 21 is released, and the absolute value of the detection value of sound or vibration becomes smaller than usual. At this time, for example, the absolute values b1, b2, . . . , bN of the peak of the detection value that is represented in the time series data of the detection value for a predetermined length of time, such as one rotation of the crawler 2, can all be calculated while being corresponded to the metal cores 21. b1 can then be subtracted from each of the absolute values b2, b3, . . . , bN, and the ratios of differences to the reference value b1, that is, (b2−b1)/b1, (b3−b1)/b1, . . . ,(bN−b1)/b1, can all be calculated and saved to the storage unit 55 or temporarily saved to the RAM 54. The previous value sequence of these ratios can then be respectively subtracted from the current value sequence of these ratios, and the resultant absolute values can be taken as index values E respectively corresponding to the metal cores 21.

When index values E such as the above have been calculated, the processing proceeds to step S7. In step S7, the anomaly detection unit 52d compares the index values E with respective thresholds $E_0$, and, if there is an index value E exceeding the threshold $E_0$, determines that an anomaly has occurred in the crawler 2 around the metal core 21 associated with that index value E. A configuration may be adopted in which, when the index value E exceeds the threshold $E_0$ a certain number of times or more in the same metal core 21, the anomaly detection unit 52d determines that an anomaly has occurred in the crawler 2 around that metal core 21. Note that the threshold $E_0$ may be set in advance, or the index value E may be calculated with a similar method to steps S1 to S6, at an early stage when the crawler 2 in which it is assumed there are no anomalies is mounted, and this calculated value may be taken as the threshold $E_0$. In the latter case, the index value E can be calculated multiple times, and the average of these values can be taken as the threshold $E_0$.

As a result of the above, if an anomaly is detected in step S7, the processing proceeds to step S8, and the alert output unit 52e generates and outputs a signal alerting about the anomaly. In step S8, the alert output unit 52e displays, on the display device 7, an alert informing that an anomaly has occurred in the crawler 2, and outputs a similar alert through the speaker 8. The alert output unit 52e also, at the same time as the alert, displays the identifier of the metal core 21 estimated to be where the anomaly has occurred and information indicating a region around that metal core 21 on the display device 7 and performs similar output through the speaker 8.

After step S8, the processing returns to step S1. The processing also returns to step S1 if no anomaly is detected in step S7. The processing shown in FIG. 9 ends when rotation of the shaft 3a stops.

When the rotation of the shaft 3a stops, the identifier of the metal core 21 stored in the storage unit 55 as the initial information 55a may be overwritten with the identifier of the metal core 21 last derived in step S3. Inputting of the identifier of the metal core 21 that is at the position P1 or position P2 by the user prior to the vehicle 1 traveling can thereby be omitted next time. Also, when the shaft 3a starts rotating again, the rotation information acquisition unit 52a may determine whether the current rotation direction is the same as the previous rotation direction, and, based on this determination, the anomaly detection unit 52d may determine whether to count the metal cores 21 in ascending order or in descending order. In the case where it is determined that the rotation direction is not the same as the previous time, the anomaly detection unit 52d may be configured to convert the identifier of the metal core 21 at one of the position P1 or position P2 that was last derived and stored into the identifier of the metal core 21 at the other of the position P1 or position P2.

3. Features

According to the information acquisition apparatus of the present embodiment, not only are anomalies that occur in the crawler 2 detected from the detection values of the first sensor 61 and second sensor 62, but detected anomalies can be associated with an identifier specifying a metal core 21. The user (driver) is thereby able to not only know that an anomaly has occurred in the crawler 2 on a timely basis, but also efficiently confirm the region where the anomaly has conceivably occurred. The user is then able to perform maintenance such as replacing the crawler 2 before the crawler 2 fails and the vehicle 1 becomes unable to travel.

4. Variations

An embodiment of the present invention has been described above, but the invention is not limited to the foregoing embodiment, and various changes can be made without departing from the spirit of the invention. For example, the following changes can be made. Also, the gist of the following variations can be combined as appropriate.

4-1

The attachment position of the first sensors 61 is not limited to that described above. To give one example, the first sensor 61 may be attached to the sprocket 3 itself or to a component that is disposed near the sprocket 3 other than a bearing. Similarly in this case, the first sensor 61 can detect characteristics of the rotation sound (sound of contact between the sprocket 3 and the crawler 2) produced when the crawler 2 winds onto the sprocket 3. To give another example, the first sensor 61 may be attached to the idler 4 itself or to a component that is disposed near the idler 4 including a bearing. In this case, the first sensor 61 can detect characteristics of the rotation sound (sound of contact between the idler 4 and the crawler 2) produced when the crawler 2 winds onto the idler 4. Note that, from the viewpoint of detecting internal anomalies of the crawler 2, the first sensor 61 is preferably disposed in a position where characteristics of the rotation sound when the crawler 2 winds onto the sprocket 3 or idler 4 can be detected.

Similarly, the attachment position of the second sensor 62 is not limited to that described above. To give one example, the second sensor 62 may also be attached to the sprocket 3 itself or to a component disposed near the sprocket 3 other than a bearing. Similarly in this case, the second sensor 62 can detect characteristics of the vibration produced by contact between the sprocket 3 and the crawler 2 when the crawler 2 winds onto the sprocket 3. To give another example, the second sensor 62 may be attached to the idler 4 itself or to a component disposed near the idler 4 including a bearing. In this case, the second sensor 62 can detect characteristics of the vibration produced by contact between the idler 4 and the crawler 2 when the crawler 2 winds onto the idler 4. Note that from the viewpoint of detecting internal anomalies of the crawler 2, the second sensor 62 is preferably located in a position where characteristics of the vibration when the crawler 2 winds onto the sprocket 3 or idler 4 can be detected.

4-2

In the above embodiment, the first sensor 61 and second sensor 62 are attached one each to one crawler 2, but a plurality of first sensors 61 may be attached to one crawler 2 at different positions and detect characteristics of the rotation sound at a plurality of locations, and a plurality of second sensors 62 may be attached to one crawler 2 in different positions and detect characteristics of the vibration at a plurality of locations. Also, either the first sensor 61 and second sensor 62 may be omitted.

4-3

In the above embodiment, a microphone for detecting sound waves was illustrated as the first sensor 61, but a sound pressure sensor may be used, for example.

4-4

The index values E described above are illustrative examples, and other types of index values can be employed as appropriate. Also, anomalies may be detected from only one index value E, without using a plurality of types of the index values E. Also, the index value E may be calculated not for each metal core 21, but for each group of a predetermined number of continuous metal cores 21. In this case, the index value E may be a frequency characteristic that is calculated by performing frequency analysis on the time series data of the detection value for a predetermined length of time corresponding to the groups of metal cores 21. At this time, for example, the peak frequency can also be taken as an index value E, or the magnitude of a frequency component of the peak frequency can also be taken as an index value E. Alternatively, the magnitude of the frequency component of a predetermined frequency or the magnitude (integral value) of the frequency component in a predetermined frequency band can also be taken as an index value E. Alternatively, when a periodic component in which k number of periods are included in a time period corresponding to a predetermined length of time, such as n1 number of rotations of the metal cores 21 of the crawler 2, is taken as a kth component, the effective value of the kth component can be taken as an index value E. Various integer values can be set as k at this time.

4-5

In the above embodiment, the rotation direction of the sprocket 3 is detected by the rotation sensor 63, but, in step S0, the rotation direction may be stored as the initial information 55a, by the user inputting whether the direction of travel of the vehicle 1 is forward or reverse.

4-6

In the above embodiment, the position P1 and position P2 are distinguished by the rotation direction of the sprocket 3, but the position P1 and position P2 need not be distinguished by the rotation direction. For example, waypoints of the position P1 and position P2 in the above embodiment may be set as predetermined positions. Also, the position P1 and position P2 are not limited to positions where the metal cores 21 and the tooth bases 32 start to mesh, as in the above embodiment, and positions in which characteristics of the rotation sound or vibration are reflected in the detection value of the sensor can be selected as appropriate.

4-7

Rather than being configured to output a rotation pulse signal corresponding to the teeth 31 and tooth bases 32 of the sprocket 3, the rotation sensor 63 may be configured to detect the rotation angle of the shaft 3a. In this case, the control unit 5 may be configured to perform conversion to D number of the tooth bases 32 that have passed through the position P1 or position P2, based on the detected rotation angle and the M number of teeth of the sprocket 3. Also, the sprocket 3 need not be given identifiers for identifying the tooth bases 32 and teeth 31.

4-8

The control unit 5 may be configured to calculate and store the travel distance of the crawler 2, based on the number of circulations C1 of the crawler 2 derived by step S3, the identifier of the metal core 21 at the position P1 or position P2, and the interval of the metal cores 21.

4-9

The identifier of the metal core 21 that is stored as the initial information 55a may be an identifier of a plurality of continuous metal cores 21. Also, the derivation unit 52b may derive the identifier of a plurality of continuous metal cores 21 that are in a predetermined area, while the vehicle 1 is traveling.

4-10

In the crawler body 20 of the above embodiment, the openings 23 which are through holes are formed, but instead of the openings 23, recessed portions that do not pass through the crawler body 20 and are configured to accept the teeth 31 of the sprocket 3 may be formed. In other words, the meshing parts that mesh with the teeth 31 of the sprocket 3 may be recessed portions rather than through holes.

4-11

In the above embodiment, the number (N) of metal cores of the crawler 2 and the number (M) of teeth of the sprocket 3 are input to the control unit 5 by the user as the initial information 55a. However, the number (M) of teeth of the sprocket 3 may be stored in the storage unit 55 or the ROM 53 in advance, before the user starts using the control unit 5. The number (N) of metal cores of the crawler 2 may also be input to the control unit 5 only once after replacing the crawler 2, rather than being input as the initial information 55a each time the information acquisition processing is performed.

LIST OF REFERENCE NUMERALS

1 Vehicle
2, 2L, 2R Crawler
3 Sprocket
4 Idler
5 Control unit (information acquisition apparatus, computer)
52 CPU (Central Processing Unit, processor)
52a Rotation information acquisition unit
52b Anomaly detection unit
61 Sound sensor
62 Vibration sensor
63 Rotation sensor

What is claimed is:

1. An information acquisition apparatus for acquiring information relating to a crawler configured to be wound around a rotationally driven sprocket connected to a rotation axle provided in a vehicle, the crawler having a meshing part configured to mesh with a tooth or a tooth base of the sprocket and being circulatorily driven in conjunction with rotation of the sprocket, the information acquisition apparatus comprising:
a memory configured to store, as initial information, the number of meshing parts of the crawler and information specifying the meshing part that is at a position at which the meshing part is configured to mesh with the tooth or the tooth base, prior to the vehicle traveling;
a processor configured to acquire rotation information of the sprocket and derive, while the vehicle is traveling, information specifying the meshing part that is at said position, based on the initial information and the rotation information; and
one or more sensors configured to be attachable to the vehicle,
wherein the processor is further configured to:
acquire a detection value representing a characteristic of at least one of a rotation sound and a vibration of the crawler from the one or more sensors,
detect an anomaly of the crawler, based on the detection value,
associate the detection value and the information specifying the meshing part that is at said position; and
estimate a position at which an anomaly has occurred in the crawler, using the associated detection value and information.

2. The information acquisition apparatus according to claim 1, wherein the one or more sensors include a sensor configured to detect a characteristic of sound.

3. The information acquisition apparatus according to claim 1, wherein the one or more sensors include a sensor configured to detect a characteristic of vibration.

4. The information acquisition apparatus according to claim 1, wherein the processor is further configured to detect the anomaly of the crawler, according to at least one of a magnitude and a frequency characteristic of the detection value.

5. The information acquisition apparatus according to claim 1, wherein the processor is further configured to detect the anomaly of the crawler, according to irregularity of the detection value in a time direction.

6. The information acquisition apparatus according to claim 1, wherein the processor is further configured to detect the anomaly of the crawler, according to irregularity of an absolute value of a periodic peak of the detection value.

7. The information acquisition apparatus according to claim 1, wherein
the processor is further configured to derive at least one of the number of circulations of the crawler in a direction in which the vehicle moves forward and the number of circulations of the crawler in a direction in which the vehicle reverses, based on the initial information and the rotation information.

8. The information acquisition apparatus according to claim 1, wherein the information specifying the meshing part that is at said position is an identifier allocated to each of the meshing parts.

9. The information acquisition apparatus according to claim 8, wherein
the identifier is allocated to each of the meshing parts starting from a reference position in a circumferential direction of the crawler.

10. The information acquisition apparatus according to claim 1,
wherein the one or more sensors are configured to be attached to the sprocket or near the sprocket, and
the processor is further configured to acquire, from the one or more sensors, the detection value representing the characteristic of at least one of the rotation sound and the vibration that are produced when the crawler winds onto the sprocket.

11. An information acquisition apparatus for acquiring information relating to a crawler configured to be wound around a rotationally driven sprocket connected to a rotation axle provided in a vehicle, the crawler having a meshing part configured to mesh with a tooth or a tooth base of the sprocket and being circulatorily driven in conjunction with rotation of the sprocket, the information acquisition apparatus comprising:
a memory configured to store, as initial information, the number of meshing parts of the crawler and information specifying the meshing part that is at a predetermined position, prior to the vehicle traveling;
a processor configured to acquire rotation information of the sprocket and derive, while the vehicle is traveling, information specifying the meshing part that is at the predetermined position, based on the initial information and the rotation information; and
one or more sensors configured to be attached to the sprocket or near the sprocket,
wherein the processor is further configured to acquire, from the one or more sensors, a detection value representing a characteristic of at least one of a rotation sound and a vibration that are produced when the crawler winds onto the sprocket, and detect an anomaly of the crawler, based on the detection value.

12. The information acquisition apparatus according to claim 11, wherein the one or more sensors include a sensor configured to detect a characteristic of sound.

13. The information acquisition apparatus according to claim 11, wherein the one or more sensors include a sensor configured to detect a characteristic of vibration.

14. The information acquisition apparatus according to claim 11, wherein the processor is further configured to detect the anomaly of the crawler, according to at least one of a magnitude and a frequency characteristic of the detection value.

15. The information acquisition apparatus according to claim 11, wherein the processor is further configured to detect the anomaly of the crawler, according to irregularity of the detection value in a time direction.

16. An information acquisition apparatus for acquiring information relating to a crawler configured to be wound around a rotationally driven sprocket connected to a rotation axle provided in a vehicle, the crawler having a meshing part configured to mesh with a tooth or a tooth base of the sprocket and being circulatorily driven in conjunction with rotation of the sprocket, the information acquisition apparatus comprising:
a memory configured to store, as initial information, the number of meshing parts of the crawler and information specifying the meshing part that is at a predetermined position, prior to the vehicle traveling;
a processor configured to acquire rotation information of the sprocket and derive, while the vehicle is traveling, information specifying the meshing part that is at the predetermined position, based on the initial information and the rotation information; and
one or more sensors configured to be attachable to the vehicle,
wherein the processor is further configured to:
acquire a detection value representing a characteristic of at least one of a rotation sound and a vibration of the crawler from the one or more sensors,
detect an anomaly of the crawler, based on the detection value, and
generate and output an alert notifying about anomaly of the crawler, and
wherein the alert includes information indicating a position at which the anomaly is estimated to have occurred.

17. An information acquisition system comprising:
a crawler configured to be wound around a rotationally driven sprocket connected to a rotation axle provided in a vehicle, the crawler having a meshing part configured to mesh with a tooth or a tooth base of the sprocket and being circulatorily driven in conjunction with rotation of the sprocket; and
an information acquisition apparatus configured to acquire information relating to the crawler,
wherein the information acquisition apparatus includes:
a memory configured to store, as initial information, the number of meshing parts of the crawler and information specifying the meshing part that is at a position at which the meshing part is configured to mesh with the tooth or the tooth base, prior to the vehicle traveling;
a processor configured to acquire rotation information of the sprocket and derive, while the vehicle is traveling, information specifying the meshing part that is at said position, based on the initial information and the rotation information; and one or more sensors configured to be attachable to the vehicle, and wherein the processor is further configured to:

acquire a detection value representing a characteristic of at least one of a rotation sound and a vibration of the crawler from the one or more sensors, detect an anomaly of the crawler, based on the detection value, associate the detection value and the information specifying the meshing part that is at said position, and estimate a position at which an anomaly has occurred in the crawler, using the associated detection value and information.

18. A non-transitory computer-readable medium storing an information acquisition program for acquiring information relating to a crawler configured to be wound around a rotationally driven sprocket connected to a rotation axle provided in a vehicle, the crawler having a meshing part configured to mesh with a tooth or a tooth base of the sprocket and being circulatorily driven in conjunction with rotation of the sprocket, the information acquisition program causing a computer to execute:

storing, as initial information, the number of meshing parts of the crawler and information specifying the meshing part that is at a position at which the meshing part is configured to mesh with the tooth or the tooth base, prior to the vehicle traveling;

acquiring rotation information of the sprocket;

deriving, while the vehicle is traveling, information specifying the meshing part that is at said position, based on the initial information and the rotation information;

acquiring a detection value representing a characteristic of at least one of a rotation sound and a vibration of the crawler from one or more sensors attached to the vehicle, detecting an anomaly of the crawler, based on the detection value, associating the detection value and the information specifying the meshing part that is at said position; and estimating a position at which an anomaly has occurred in the crawler, using the associated detection value and information.

* * * * *